United States Patent [19]
Higgs et al.

[11] Patent Number: 5,996,939
[45] Date of Patent: Dec. 7, 1999

[54] AERIAL REFUELING BOOM WITH TRANSLATING PIVOT

[75] Inventors: John T. Higgs, Newton; William A. Gates, Wichita; John H. Schuster, Derby; Clint A. Luttgeharm, Wichita; Carl O. Crowdis, Rose Hill, all of Kans.

[73] Assignee: The Boeing Company, Seattle, Wash.

[21] Appl. No.: 09/141,699

[22] Filed: Aug. 28, 1998

[51] Int. Cl.⁶ .................................................. B64D 15/00
[52] U.S. Cl. ................................... 244/135 A; 244/135 R
[58] Field of Search ........................... 244/135 A, 135 R, 244/136

[56] References Cited

U.S. PATENT DOCUMENTS

| 2,663,523 | 12/1953 | Leisy . | |
|---|---|---|---|
| 2,859,002 | 11/1958 | Leisy . | |
| 3,008,674 | 11/1961 | Abraham . | |
| 3,055,620 | 9/1962 | Weiland | 244/135 A |
| 4,905,937 | 3/1990 | Spotswood et al. . | |
| 5,141,178 | 8/1992 | Alden et al. . | |
| 5,573,206 | 11/1996 | Ward | 244/135 A |
| 5,667,170 | 9/1997 | Moss et al. | 244/135 A |
| 5,785,276 | 7/1998 | Ruzicka | 244/135 A |

*Primary Examiner*—J. Woodrow Eldred
*Attorney, Agent, or Firm*—Brooks & Kushman P.C.

[57] ABSTRACT

An aerial refueling system includes a pod assembly which is removably mounted for translation on an elongated pylon secured to the underside of an aircraft fuselage, whereby the pod assembly is moved relatively forward on the fuselage for stowage and relatively aftward on the fuselage for refueling operations. The pod assembly includes a pivotable, telescoping boom having control surfaces by which to aerodynamically position the boom's free end relative to the pod assembly. A coupling preferably establishes fluid communication between the boom and a fuel tank within the aircraft fuselage only when the pod assembly assumes the relatively-aftward refueling position on the pylon. A ram-air turbine on the forward end of the pod assembly provides all necessary power for the pod assembly, with wireless remote operation of all pod assembly functions preferably used to minimize the extent of alterations when installing the aerial refueling system on the aircraft.

20 Claims, 3 Drawing Sheets

AERIAL REFUELING BOOM WITH TRANSLATING PIVOT

BACKGROUND OF THE INVENTION

1. Technical Field

The invention relates to aerial refueling systems, whereby a first aircraft may refuel a second aircraft during flight.

2. Background Art

Aerial refueling is a common method for extending the flight time and range of an aircraft and typically involves a tanker aircraft, which is loaded with excess fuel, transferring fuel to one or more trailing or receiver aircraft.

One known type of refueling system is the "boom"-type disclosed in U.S. Pat. No. 2,663,523. In this system, a rigid refueling boom pivotally mounted beneath the tail of the aircraft is deployed downwardly to a receiver aircraft which is positioned behind and beneath the tanker. An operator located within the tanker controls the movement of the boom relative to the tanker aircraft so as to direct its free end into a refueling port on the receiver aircraft. The boom is often provided with an aerodynamic profile which serves both to facilitate positional control and lower resulting drag loads during refueling operations.

One drawback of known boom-type systems is that the boom must be permanently incorporated within the structure of the aircraft, thereby implicating substantial aircraft alternations to the aircraft not otherwise amenable to temporary installations. Moreover, such known boom type systems reduce the ground clearance in the region of the aircraft tailcone and, hence, limit the amount of aircraft rotation available for take-off and landing maneuvers. A reduced amount of available rotation in turn reduces the angle of attack of the aircraft's wings and, hence, the generated lift by a corresponding amount, with the net result being a significant reduction in the operational payload capability of the aircraft. The payload reduction is most severe when modern transport aircraft utilizing wings with high lift devices are burdened with the envelope of such known, aft-mounted refueling booms.

An alternate type of refueling system is disclosed in U.S. Pat. No. 3,008,674. In this system, a detachable refueling pod is mounted beneath the main wing of the tanker aircraft. A hose is deployed from the aft portion of the refueling pod, whereupon a stabilizer drogue attached to the hose's trailing end facilitates interconnection with the receiving aircraft. In a variation on this theme, U.S. Pat. No. 5,667,170 teaches mounting such a detachable refueling pod to either side of the aircraft fuselage between the main wings and the aft stabilizers, such that, when deployed, each pod's respective refueling hose is channeled away from the aircraft fuselage, with the further benefit of reducing the maximum loads applied to the wing otherwise encountered when refueling with wing-mounted pods.

However, such trailing hose refueling systems, whether wing-mounted or fuselage-mounted, continue to suffer from a lack of positive control over the motion of the drogue and the trailing end of the refueling hose. The situation is further complicated by the airflow over the wing and fuselage during flight.

Accordingly, what is needed is a detachable aerial refueling system which advantageously employs a boom for added control and reduced aerodynamic drag, without suffering payload capacity penalty of known boom-type systems.

SUMMARY OF THE INVENTION

It is an object of the invention to provide an aerial refueling system which is easily mounted to and removable from a tanker aircraft with minimal structural modifications.

Another object of the invention is to provide an aerial refueling system which employs a boom which does not otherwise reduce the amount of aircraft rotation available during liftoff.

Another object of the invention is to provide a refueling system which imposes minimal drag, lift and bending loads on a tanker aircraft.

In accordance with the invention, an aerial refueling system for an aircraft includes a pylon which is temporarily or permanently secured to the underside of the aircraft's fuselage, and a pod assembly removably mounted on the pylon for translation along a path between a first, relatively-forward position on the pylon and a second, relatively-aftward position on the pylon. In an exemplary system, the path defined by the pylon along which the pod assembly is translated extends substantially parallel to the longitudinal axis of the aircraft, with the first pod assembly position being located at a point on the fuselage roughly forward of the main wings, and with the second pod assembly position being located at a point on the fuselage just forward of the aircraft tailcone.

The pod assembly itself includes a pod housing, a refueling conduit having a first end supported by the housing, and a coupling establishing fluid communication between an internal fuel source within the aircraft and the refueling conduit when the pod assembly is in the second position on the pylon. In an exemplary system, the refueling conduit includes a rigid boom which is supported for pivotal movement relative to the pod housing. The boom, which may include telescoping sections, preferably includes control surfaces proximate to its free end which are operative to aerodynamically manoeuver/position the boom relative to the pod housing and, hence, relative to the aircraft fuselage during flight period.

In accordance with another feature of the invention, in an exemplary system, the pod assembly further includes a ram-air turbine at its forward end for generating hydraulic and electric power for use by various systems within the pod assembly, such as a hydraulic drive mechanism operative to translate the pod assembly along the path between its first and second positions on the pylon, the boom control surfaces, and a wireless controller by which a remote operator may control both the drive mechanism and the boom control surfaces. The use of a wireless controller permits the ready installation of both the pylon and the removably mounted pod assembly on the aircraft fuselage with minimal structural modifications.

While an exemplary aerial refueling system in accordance with the invention is illustrated and disclosed, this illustration and disclosure should not be construed to limit the claims. It is anticipated that various modifications and alternative designs may be made without departing from the scope of the invention.

DETAILED DESCRIPTION OF THE INVENTION

Figure 1:
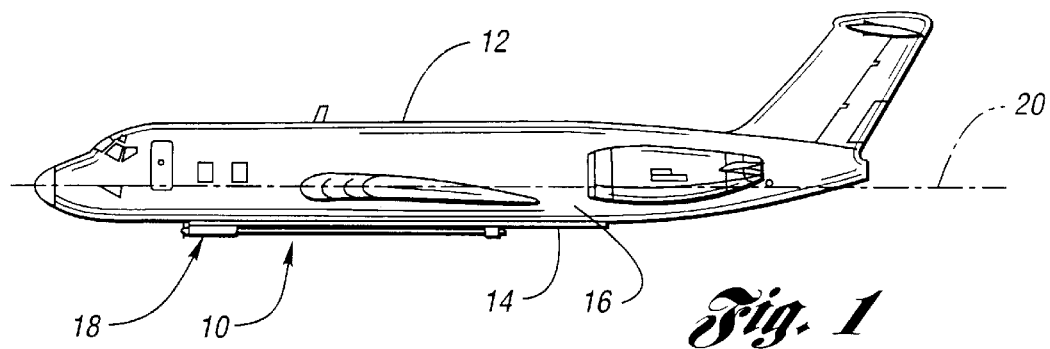
FIG. 1 is a side elevational view of an aircraft outfitted with an aerial refueling system in accordance with the invention, with the pod translated to its first, relatively-forward position on its supporting pylon.
Figure 2:
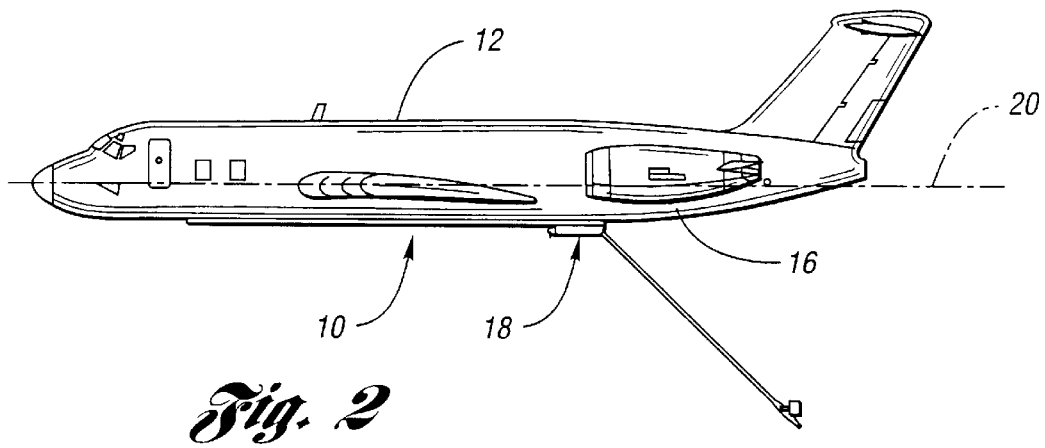
FIG. 2 is a side elevational view of the aircraft shown in FIG. 1, wherein the pod assembly is in its second, relatively-aftward position with its boom extending downwardly for purposes of refueling.

Referring to FIGS. 1 and 2, an exemplary aerial refueling system 10 for a tanker aircraft 12 includes an elongated pylon 14 which is secured in any suitable manner to the underside of the aircraft's fuselage 16. For example, in the exemplary system 10, the pylon 14 is attached to the aircraft 12 at discrete points along the length of the pylon 14, as through use of fasteners (not shown). The use of such discrete attachment points requires the pylon 14 to be more structurally robust in order to span the distance between these points. However, use of such discreet attachment points facilitates temporary installation of the pylon 14 from the aircraft 12 while further requiring only local modifications to the underside of the aircraft fuselage 16.

Returning to FIGS. 1 and 2, a pod assembly 18 is removably mounted on the pylon 14 for translation along a path between a first, relatively-forward position on the pylon 14 (as illustrated in FIG. 1) and a second, relatively-aftward position on the pylon 14 (as illustrated in FIG. 2). Preferably, the path thus defined by the length of the pylon 14 extends substantially parallel to a longitudinal axis 20 of the aircraft, as illustrated in FIGS. 1 and 2.

Figure 3:
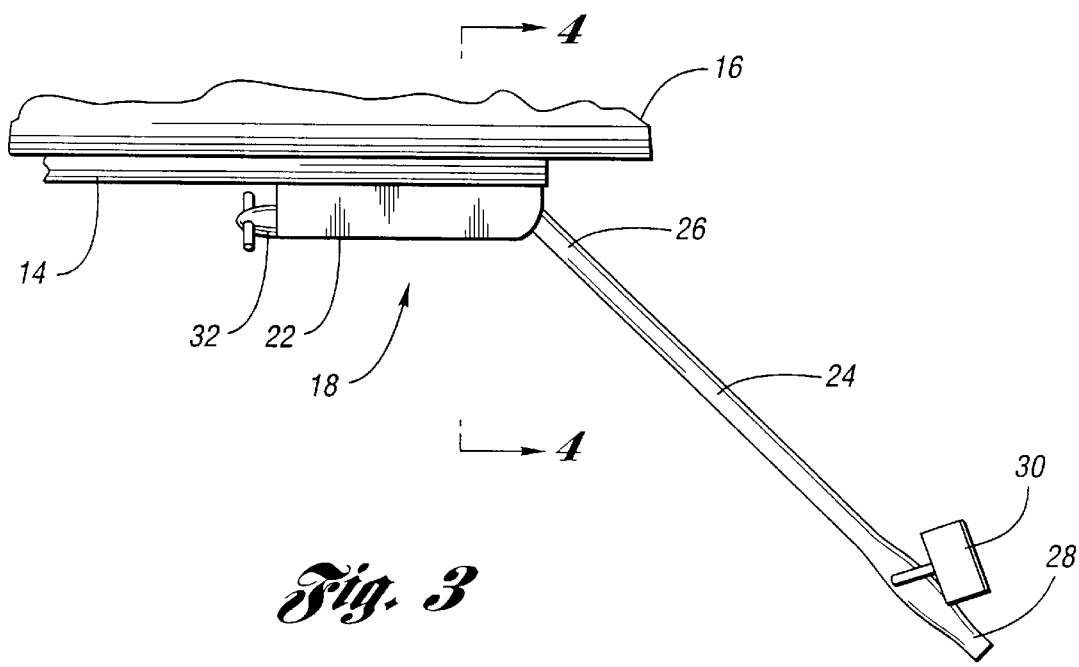
FIG. 3 is a partial, enlarged side elevational view of the pod assembly in its second position.

As seen more clearly in FIG. 3, the pod assembly includes a pod housing 22 and a refueling conduit, such as a refueling boom 24, pivotally supported by the pod housing 22 proximate to the boom's first end 26. While the invention contemplates any suitable mechanism by which to pivotally support the boom 24 on the housing 22, a gimbal ring mechanism (not shown) may conveniently be used to permit the boom's free end 28 to swing universally, within limits. It will be appreciated that, while the boom 24 illustrated in FIGS. 1–3 has but one section, the invention contemplates use of a boom having multiple, telescoping sections (not shown). Control surfaces 30 on the boom 24 proximate to its free end 28 are operative to aerodynamically position the boom's free end 28 relative to the pod housing during flight.

The forward end of the pod assembly 18 includes a ram-air turbine 32 for generating both hydraulic and electrical power for use within the pod assembly 18. For example, the ram-air turbine 32 preferably provides power for operating the control surfaces 30 on the free end 28 of the boom 24.

Figure 4:
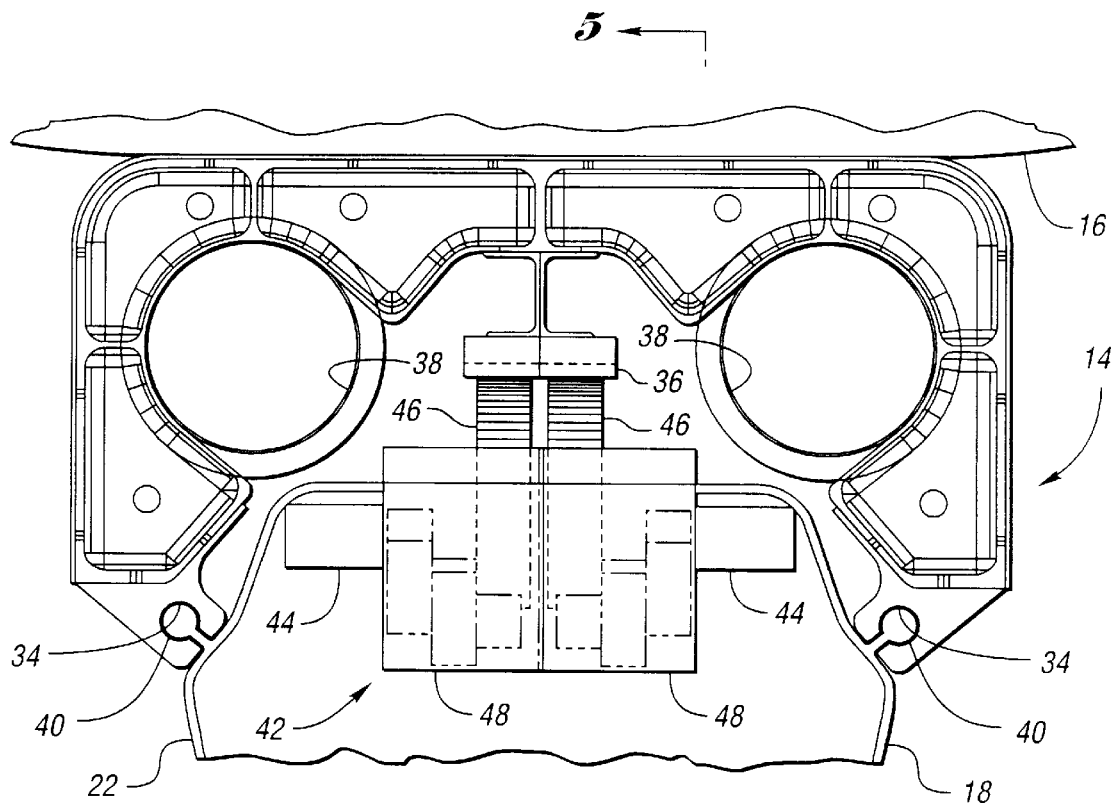
FIG. 4 is a view in transverse cross-section of the pod assembly taken along line 4—4 of FIG. 3.

Referring to FIG. 4, the pylon 14 includes a pair of laterally-disposed circular tracks 34 and a centrally-supported rack gear 36 (the purpose of which is described below). The aftermost portion of the pylon 14 also includes a pair of forward-facing fuel ports 38, each of which is coupled to a fuel source, for example, a fuel tank (not shown) located within the aircraft 12.

The pod housing 22 includes a pair of laterally-spaced slides 40 which are adapted to be received within the tracks 34 on the pylon 14. The slides 40 are preferably coated with a lubricating film such as PTFE or, alternatively, be formed of a self-lubricating material, in order to facilitate translation of the pod assembly 18 on the pylon 14. The entrance angle of these tracks/sliders is preferably inclined to an optimal angle to accommodate operational loads applied to the pylon 14 by the pod assembly 18, both in flight and during refueling operations.

The controlled translation of the pod assembly 18 along the path defined by the pylon 14 is achieved by a drive mechanism 42 which preferably includes a redundant drive capability. In the exemplary system 10 illustrated in FIGS. 1–6, the drive mechanism 42 includes a pair of hydraulic drive motors 44 mounted within the pod housing 22, each of which is preferably powered by the pod assembly's ram-air turbine 32.

Figure 5:
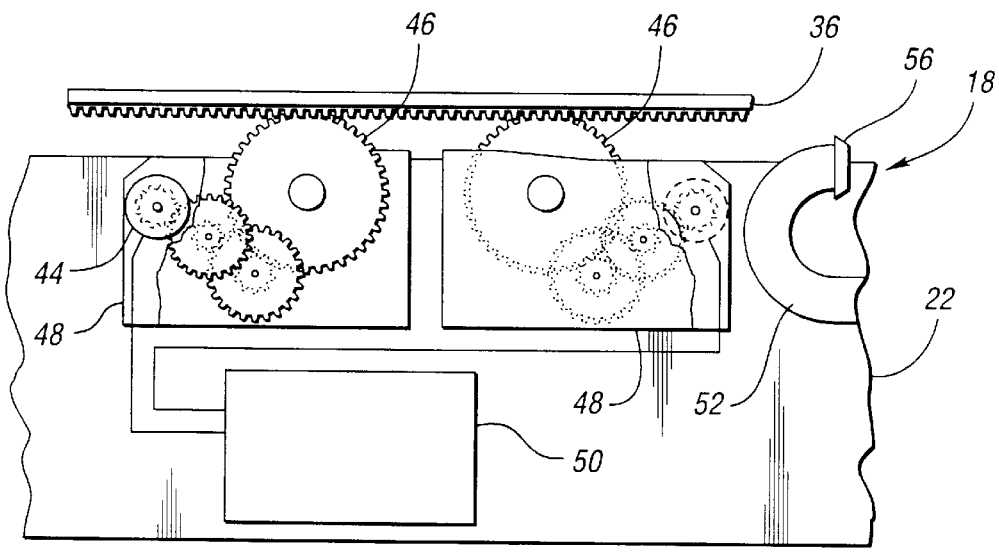
FIG. 5 is a partial longitudinal section of the pod assembly taken along line 5—5 of FIG. 4.
Figure 6:
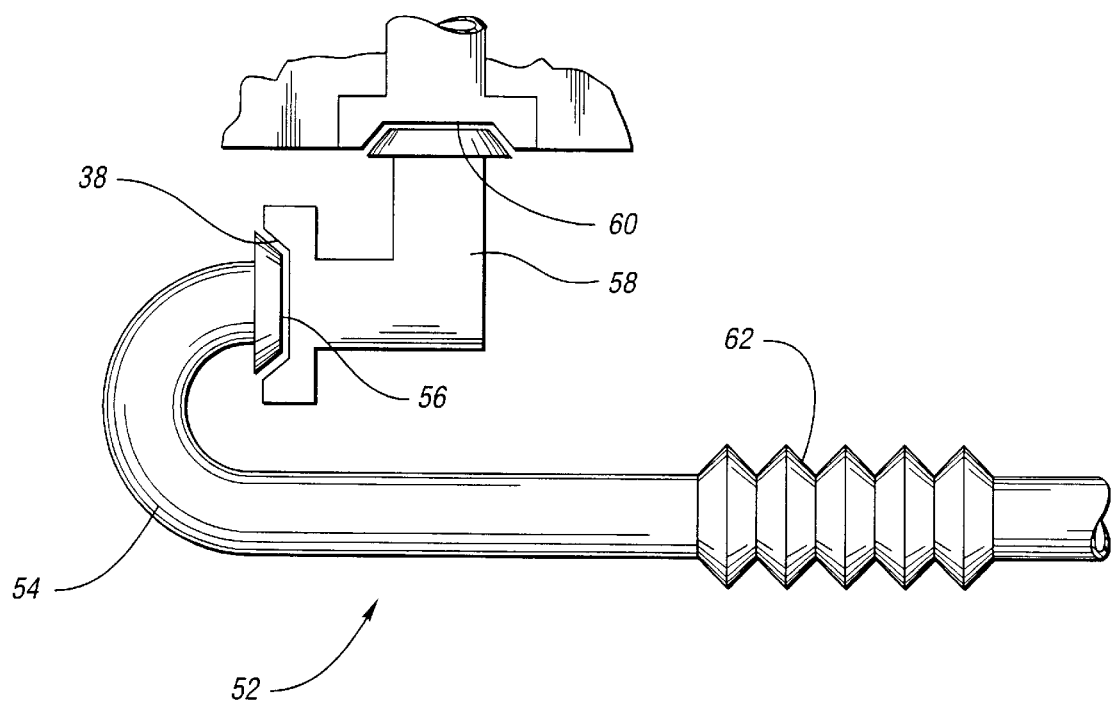
FIG. 6 is a view in side elevation of a frangible coupling establishing fluid communication between a forward-facing fuel port on the pylon and the boom of the pod assembly.

As shown in FIGS. 4 and 5, each drive motor 44 independently drives a respective pinion gear 46 through suitable reduction gearing 48. Each pinion gear 46 in turn engages a respective side of the pylon's rack gear 36. Positional feedback is achieved by encoding the rotations of the pinion gears 46 using angular position sensors (not shown) in a known manner. It will be readily appreciated that, while the rack-and-pinion drive mechanism of the exemplary system 10 is believed to offer certain advantages, other suitable drive mechanisms, such as one employing a chain/cable loop, may be employed In the exemplary system 10 illustrated in the Figures, the pod assembly 18 further includes a wireless controller 50 (shown schematically in FIG. 5) for controlling the drive motors 44 and, hence, the relative position of the pod assembly 18 on the pylon 14 and the control surfaces 30 on the boom 24. The wireless controller 50 may include a RERAD unit (not shown) to achieve two-way wireless communication in real time between the pod assembly 18 and a boom operator stationed aboard the aircraft 12. As is the case with other pod assembly systems, the wireless controller 50 is preferably powered by the pod assembly's ram-air turbine 32.

In accordance with another feature of the invention, the pod assembly 18 includes a synthetic vision system (not shown), for example, a remote viewing system preferably featuring stereoscopic vision, by which to assist a boom operator aboard the aircraft 12 in controlling relative boom position.

It will be appreciated that the invention contemplates the use of other designs allowing for communication between the pod assembly and the aircraft, such as brush-type connectors or wire stored on a take-up reel. Preferably, the communication system provides "fly-by-wire" control of the boom 24. In this manner, the pod assembly 18 employs the ram-air turbine to provide all of its power requirements, thereby avoiding unnecessary alternations of aircraft hydraulic and/or electrical systems prior to system installation.

As seen in FIG. 5, the pod assembly 18 also includes a pair of fluid couplings 52 by which to establish fluid communication between the pylon's fuel ports 38 and the pod assembly's pivoting boom 24. Each coupling 52, one of which is shown in greater detail in FIG. 6, generally includes a U-shaped turn 54 by which to present an aftward-facing male connector 56 with which to engage its respective forward-facing fuel port 38 on the pylon 14. A short, L-shaped fuel tube 58 couples the pylon's forward-facing fuel port 38 to a fixed fuel port 60 on the underside of the aircraft's fuselage 16. Each coupling 52 preferably further includes a section formed of flexible tubing 62 to facilitate pivoting movement of the boom 24 relative to the pod housing 22.

Because each coupling's aftward-facing connector 56 engages its respective pylon fuel port 38 only when the pod assembly 18 is in its second, relatively-aftward position on the pylon 14, each coupling 52 will establish fluid communication between the aircraft's internal tank and the pod assembly's boom 24 only when the pod assembly 18 has been translated aft to the second position on the pylon 14.

In accordance with another feature of the invention, a portion of each coupling, such as its U-shaped turn 54, is preferably formed of a relatively frangible material such that, in the event of an emergency landing, the couplings 52 will not impede the disengagement of the pod assembly 18 from the pylon 14.

Figure 7:
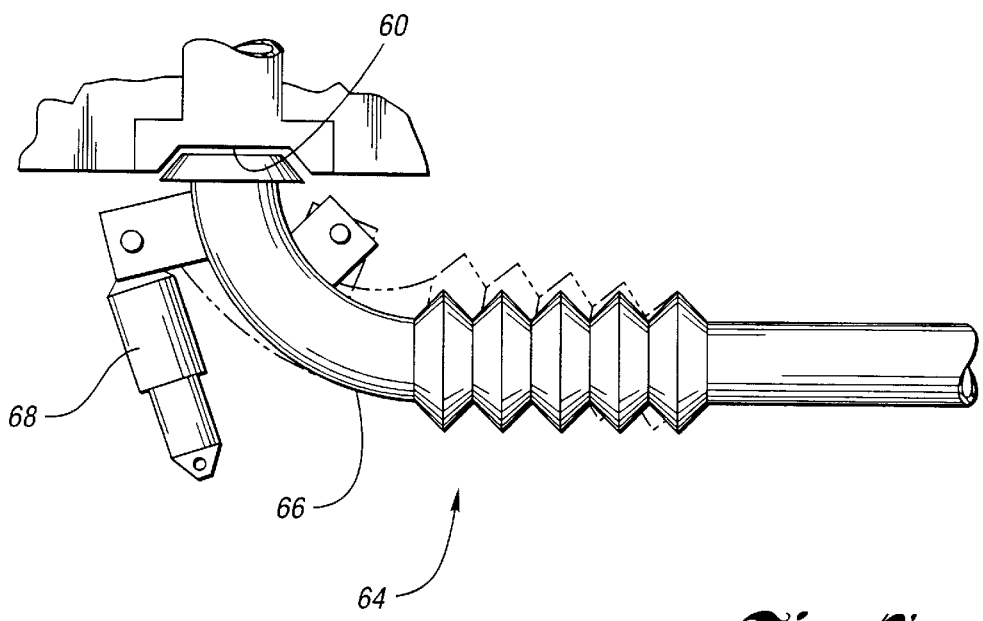
FIG. 7 is a view and side elevation of an alternate, articulating coupling for establishing fluid communication between an aircraft fuel port and the pod assembly's boom.

FIG. 7 shows an alternate, articulating coupling 64 for use in an aerial refueling system in accordance with the invention. An L-shaped fuel tube 66 acts as a bell-crank to plug into the fixed fuel port 60 on the underside of the aircraft's fuselage 16 upon operation of an actuator 68. Such an articulating coupling 64 has the advantage that the pod assembly 18 may be jettisoned off of the aftermost end of the pylon 14 in case of an emergency without having to break the coupling 64. Other advantages include a minimum increase in pod assembly frontal area and a flush-mounted fuel port in the aircraft upon removal of the pod assembly 18 from the pylon 14.

In operation, the pod assembly 18 is translated to its first position on the pylon 14 for take-offs, landings, and general flight conditions. Immediately prior to commencement of refueling operations, the control surfaces 30 on the boom 24 are operated to aerodynamically displace the free end 28 of the boom 24 downwardly relative to the aircraft's fuselage 16. Each drive motor 44 is then operated to translate the pod assembly 18, with its deployed boom 24, to its second position on the pylon 14. With the pod assembly 18 now in its second position on the pylon 14, each coupling 52 within the pod assembly 18 establishes fluid communication between the aircraft's fuel port 60 and the boom 24, and refueling can commence.

Upon completion of the refueling operation, the drive motors 44 are once again operated to translate the pod assembly 18 from its second position to its first position on the pylon 14 while the boom 24 remains in its deployed position. The boom control surfaces 30 are thereafter operated to aerodynamically reposition the free end 28 of the boom 24 up against the underside of the aircraft's fuselage 16.

In this regard, the invention contemplates use of any suitable mechanism by which the boom 24 may thereafter be retained in its "stowed" position against the underside of the aircraft's fuselage 16 (as illustrated in FIG. 1). By way of example only, a pin (not shown) extending upwardly from the boom may be received in a suitable socket-type fixture (not shown) located on either the pylon 14 or the underside of the fuselage 16 to thereby secure the boom 24 relative to the aircraft 12.

Alternatively, a pair of laterally-spaced sliders (also not shown) may be provided along the length of the boom 24 such that, if the boom control surfaces 30 are operated to aerodynamically reposition the boom 24 up against the underside of the aircraft's fuselage 16 prior to translating the pod assembly 18 from its second position on the pylon 14 back to the first position on the pylon 14, upon subsequent forward translation of the pod assembly 18, the boom-mounted sliders can be received within the pylon's tracks 34 to thereby secure the boom 24 relative to the aircraft 12.

While an exemplary aerial refueling system 10 of the invention has been illustrated and described, it is not intended that this embodiment illustrate and describe all possible forms of the invention. Rather, it is intended that the following claims cover all modifications and alternative designs, and all equivalents, that fall within the spirit and scope of this invention.

For example, while the pylon 14 of the exemplary system 10 is discretely attached to the aircraft's fuselage 16, the invention contemplates, in the alternative, the continuous attachment of the pylon 14 to the aircraft's fuselage. Such continuous attachment distributes loads into the aircraft airframe over a greater length and, hence, can be relatively smaller in size. Under the invention, if the pylon 14 is continuously attached to the aircraft 12, the pod assembly 18 may still be removed from the pylon 14 while the pylon 14 remains as a permanent attachment to the aircraft 12. Similarly, while a track-and-slider configuration for mounting the pod assembly 18 on the pylon 14 is disclosed, the invention contemplates any suitable combination, including track-and-roller configurations, which minimize drag loads associated with translation of the pod assembly 18 on the pylon 14 while further minimizing the number of parts employed.

What is claimed is:

1. An aerial refueling system for an aircraft, wherein the aircraft includes an elongate fuselage defining a forward end, an aft end, and a longitudinal axis, and wherein the aircraft includes a fuel source within the fuselage coupled to a fuel port, the system comprising:

a pylon; and a pod assembly mounted on the pylon for translation along a path between a first, relatively-forward position on the pylon and a second, relatively-aftward position on the pylon, wherein the pod assembly includes a housing, a refueling conduit having a first end supported by the housing, and a coupling establishing fluid communication between the fuel port and the refueling conduit when the pod assembly is in the second position.

2. The system of claim 1, wherein the pod assembly is removably mounted on the pylon.

3. The system of claim 1, wherein the path extends substantially parallel to the longitudinal axis of the aircraft.

4. The system of claim 1, wherein the refueling conduit includes a rigid boom, and wherein the boom is supported for pivotal movement relative to the housing.

5. The system of claim 4, wherein the boom includes control surfaces operative to aerodynamically position a second, free end of the boom relative to the housing during flight.

6. The system of claim 5, wherein the pod assembly further includes a ram-air turbine for generating power, and wherein the ram-air turbine supplies power to operate the boom control surfaces.

7. The system of claim 6, further including a wireless controller for remotely controlling the boom control surfaces from within the aircraft.

8. The system of claim 7, wherein the ram-air turbine supplies power to the wireless controller.

9. The system of claim 1, wherein the coupling establishes the fluid connection between the fuel tank and the boom only when the pod assembly is in the second position on the pylon.

10. The system of claim 9, wherein a portion of the coupling is frangible.

11. The system of claim 1, wherein the pod assembly includes a drive mechanism operative to move the pod assembly along the path between the first position and the second position.

12. The system of claim 10, wherein the pylon defines a rack gear, and wherein the drive mechanism includes a pinion gear engageable with the rack gear, and a motor mechanically coupled to the pinion gear.

13. The system of claim 11, wherein the pod assembly further includes a ram-air turbine for generating power, and wherein the ram-air turbine supplies power to the drive mechanism.

14. The system of claim 1, wherein one of the group consisting of the pylon and the pod assembly includes a track, and wherein the other of the group consisting of the pylon and the pod assembly includes a slider engagable with the track.

15. The system of claim 1, wherein the pod assembly includes a ram-air turbine.

16. The system of claim 1, further including a wireless controller for controlling the relative position of the pod assembly on the pylon and the control surfaces on the boom.

17. A method for refueling a first aircraft during flight with a second aircraft, wherein the second aircraft includes a pod assembly mounted for translation along a path between a first, relatively-forward position on the second aircraft and a second, relatively-aftward position on the second aircraft, the pod assembly including a refueling conduit, the method including:

translating the pod assembly to the second position when refueling the first aircraft during flight.

18. The method of claim 17, including deploying the refueling conduit from the pod assembly when the pod assembly is in the second position.

19. The method of claim 18, wherein the refueling conduit includes a rigid boom supported for pivotal movement, and wherein deploying the refueling conduit includes pivoting the boom relative to the pod assembly when the pod assembly is in the second position.

20. The method of claim 17, wherein the second aircraft includes a fuel source, and including coupling the fuel source with the refueling conduit when the pod assembly is in the second position.

* * * * *